United States Patent
Takahashi et al.

(10) Patent No.: US 8,917,701 B2
(45) Date of Patent: *Dec. 23, 2014

(54) MOBILE COMMUNICATION METHOD AND RADIO BASE STATION

(75) Inventors: Hideaki Takahashi, Yokohama (JP); Wuri Andarmawanti Hapsari, Yokosuka (JP); Takeshi Okamoto, Yokosuka (JP); Hiroyuki Hosono, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/390,693

(22) PCT Filed: Aug. 16, 2010

(86) PCT No.: PCT/JP2010/063817
§ 371 (c)(1),
(2), (4) Date: Apr. 11, 2012

(87) PCT Pub. No.: WO2011/021603
PCT Pub. Date: Feb. 24, 2011

(65) Prior Publication Data
US 2012/0188984 A1    Jul. 26, 2012

(30) Foreign Application Priority Data

Aug. 18, 2009 (JP) ................................. 2009-189600

(51) Int. Cl.
*H04W 4/00* (2009.01)
*H04W 36/00* (2009.01)
*H04W 8/26* (2009.01)
*H04W 36/30* (2009.01)

(52) U.S. Cl.
CPC ............ *H04W 36/0083* (2013.01); *H04W 8/26* (2013.01); *H04W 36/30* (2013.01)
USPC ........... 370/331; 370/231; 370/328; 370/348; 370/389; 370/401; 455/438; 455/437; 455/423; 455/522

(58) Field of Classification Search
USPC ................. 370/231, 328, 331, 348, 389, 401; 455/438, 437, 423, 522, 63.1
See application file for complete search history.

(56) References Cited

U.S. PATENT DOCUMENTS 7,792,079 B2 * 9/2010 Choi et al. ..................... 370/331
8,121,589 B2 * 2/2012 Fischer et al. ................ 455/423

(Continued)

FOREIGN PATENT DOCUMENTS

| JP | 2012-509638 A | 4/2012 |
| JP | 5073718 B2 | 11/2012 |
| WO | 2010059099 A1 | 5/2010 |

OTHER PUBLICATIONS

Office Action for Japanese Patent Application No. 2009-189600 mailed Apr. 17, 2012, with English translation thereof (4 pages).

(Continued)

*Primary Examiner* — Andrew Lai
*Assistant Examiner* — Andrew C Lee
(74) *Attorney, Agent, or Firm* — Osha Liang LLP (57) ABSTRACT

A mobile communication method according to the present invention includes: a step in which a mobile station UE transmits "Measurement Report" including identification information "ECGI" on a cell subordinate to a radio base station eNB, to a radio base station HeNB; a step in which a radio base station HeNB transmits "(X2) HO Request" including the identification information "ECGI" of the cell subordinate to the radio base station eNB, to an IP address of a gateway device HeNB-GW; and a step in which the gateway device HeNB-GW transfers the "(X2) HO Request" to the IP address corresponding to the identification information "ECGI" on the cell subordinate to the radio base station eNB.

4 Claims, 8 Drawing Sheets

(56) References Cited

U.S. PATENT DOCUMENTS

| | | | |
|---|---|---|---|
| 8,369,854 B2* | 2/2013 | Peisa et al. | 455/436 |
| 2007/0224993 A1* | 9/2007 | Forsberg | 455/436 |
| 2008/0146231 A1* | 6/2008 | Huang et al. | 455/436 |
| 2008/0192697 A1* | 8/2008 | Shaheen | 370/331 |
| 2008/0233963 A1* | 9/2008 | Alanara et al. | 455/438 |
| 2009/0040982 A1* | 2/2009 | Ho et al. | 370/331 |
| 2009/0215460 A1* | 8/2009 | Hasegawa | 455/437 |
| 2010/0040023 A1* | 2/2010 | Gallagher et al. | 370/331 |
| 2010/0242103 A1* | 9/2010 | Richardson et al. | 726/7 |
| 2010/0291934 A1* | 11/2010 | Lopes | 455/446 |
| 2012/0188984 A1 | 7/2012 | Takahashi et al. | |

OTHER PUBLICATIONS

International Search Report w/translation from PCT/JP2010/063817 dated Sep. 21, 2010 (3 pages).

3GPP TSG-RAN WG2 #66bis; R2-093972; "Report of email discussion [66#22] on Relay architecture"; NTT DoCoMo; Los Angeles, USA; Jun. 29-Jul. 3, 2009 (30 pages).

3GPP TSG RAN WG2#65bis, R2-092388; "Support for inbound CSG mobility"; Panasonic; Seoul, Korea; Mar. 23-27, 2009 (3 pages).

3GPP TS 36.300 V9.0.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)"; Jun. 2009 (157 pages).

3GPP TR R3.020 V0.9.0; "3rd Generation Partnership Project; Technical Specification Group Radio Access Network; Home (e)NodeB; Network aspects (Release 8)"; Sep. 2008 (67 pages).

3GPP TS 36.423 V8.6.0; "3rd Generation Partnership Project; Technical Specification Group Radio Access Network; Evolved Universal Terrestrial Radio Access Network (E-UTRAN); X2 application protocol (X2AP) (Release 8)"; Jun. 2009 (100 pages).

Office Action issued in corresponding Japanese Application No. 2012-182902, mailed Jul. 23, 2013 (6 pages).

Ericsson; "X2 NRL self-configuration"; 3GPP TSG-RAN WG3 #60, R3-081462; Kansas City, US, May 5-9, 2008 (1 page).

* cited by examiner

(HeNB-GW) NEIGHBOR RELATION TABLE (NRT)

| NO. | PCI | ECGI | TAI | NO REMOVE | NO HO | NO X2 | IP ADDRESS |
|---|---|---|---|---|---|---|---|
| 1 | 3 | 11010001 | 1000 | | | | m.n.o.p |
| 2 | 4 | 11010002 | 1000 | | | | q.r.s.t |
| 3 | 5 | 87654321 | 2000 | | | | u.v.w.x |
| 4 | ... | ... | | | | | ... |

(HeNB) NEIGHBOR RELATION TABLE (NRT)

| NO. | PCI | ECGI | TAI | NO REMOVE | NO HO | NO X2 | IP ADDRESS |
|---|---|---|---|---|---|---|---|
| 1 | 3 | 87654321 | 2000 | | | | i.j.k.l |

MOBILE COMMUNICATION METHOD AND RADIO BASE STATION

TECHNICAL FIELD

The present invention relates to a mobile communication method, and a radio base station.

BACKGROUND ART

In order for a network to be able to accommodate many different radio base stations HeNB (Home eNB), a mobile communication system of the E-UTRAN scheme is configured such that a gateway device HeNB-GW (HeNB Gateway) can be provided between a mobile switching center MME and a radio base station HeNB.

S1 interfaces (specifically, an S1 C-plane (S1-C) and an S1 U-plane (S1-U)) are defined between the mobile switching center MME and the gateway device HeNB-GW, and also between the gateway device HeNB-GW and the radio base stations HeNB.

The configuration herein is such that S1 C-plane signaling (S1-AP messages) that is individual to a mobile station UE is not terminated by, but rather relayed by the gateway device HeNB-GW.

The configuration is also such that S1 C-plane signaling that is not individual to the mobile station UE is terminated by the gateway device HeNB-GW.

The S1 U-plane data may be configured to be relayed by the gateway device HeNB-GW, or may be configured to be terminated by the gateway device HeNB-GW.

SUMMARY OF THE INVENTION

Problems to be Solved by the Invention

However, the conventional mobile communication system of the E-UTRAN scheme, being configured such that S1 C-plane signaling that is individual to the mobile station UE is not terminated by but rather relayed by the gateway device HeNB-GW, has been problematic in that because handover messages are S1 C-plane signaling that is individual to the mobile station UE, each time the mobile station UE executes a handover from a cell that is subordinate to a radio base station HeNB accommodated in the gateway device HeNB-GW to the radio base station eNB, the mobile switching center MME needs to execute a predetermined process, leading to an increased process load on the mobile switching center MME.

Therefore, the present invention has been achieved in view of the problem described above, and an object thereof is to provide a mobile communication method and a radio base station, by which it is possible to reduce the process load on the mobile switching center MME when the mobile station UE executes a handover from a cell that is subordinate to a radio base station HeNB that is accommodated in the gateway device HeNB-GW to the radio base station eNB.

Means for Solving the Problem

A first characteristic of the present embodiment is summarized in that a mobile communication method in which a mobile station executes a handover from a cell subordinate to a first radio base station accommodated in a gateway device to a cell subordinate to a second radio base station, the mobile communication method comprising, a step in which the mobile station sends a measurement report including identification information on the cell subordinate to the second radio base station to the first radio base station, a step in which the first radio base station sends a handover request message including the identification information on the cell subordinate to the second radio base station to an IP address of the gateway device, and a step in which the gateway device transfers the handover request message to the IP address corresponding to the identification information on the cell subordinate to the second radio base station.

A second characteristic of the present embodiment is summarized in that a mobile communication method in which a mobile station executes a handover from a cell subordinate to a first radio base station accommodated in a gateway device to a cell subordinate to a second radio base station, the mobile communication method comprising, a step in which the mobile station sends a measurement report including identification information on the cell subordinate to the second radio base station to the first radio base station, and a step in which the first radio base station decides whether the handover request message including the identification information on the cell subordinate to the second radio base station should be sent to the gateway device or to a mobile switching center.

A third characteristic of the present embodiment is summarized in that a radio base station in a mobile communication system in which a mobile station is capable of executing a handover from a cell subordinate to a first radio base station accommodated in a gateway device to a cell subordinate to a second radio base station, the radio base station being able to behave as the first radio base station, comprising, a transmission unit configured to always send a handover request message including identification information on the cell subordinate to the second radio base station to the IP address of the gateway device in a case in which a measurement report including the identification information on the cell subordinate to the second radio base station has been received from the mobile station.

A fourth characteristic of the present embodiment is summarized in that a radio base station in a mobile communication system in which a mobile station is capable of executing a handover from a cell subordinate to a first radio base station accommodated in a gateway device to a cell subordinate to a second radio base station, the radio base station being able to behave as the first radio base station, comprising, a decision unit configured to decide whether the handover request message including the identification information on the cell subordinate to the second radio base station should be sent to the gateway device or the mobile switching center in a case in which the measurement report including the identification information on the cell subordinate to the second radio base station has been received from the mobile station.

Effect of the Invention

As described above, according to the present invention, it is possible to provide a mobile communication method and a radio base station, by which it is possible to reduce the process load on the mobile switching center MME when the mobile station UE executes a handover from a cell that is subordinate to a radio base station HeNB that is accommodated in the gateway device HeNB-GW to the radio base station eNB.

BEST MODES FOR CARRYING OUT THE INVENTION (Configuration of Mobile Communication System According to First Embodiment of the Present Invention)

A description will now be provided for the configuration of a mobile communication system according to a first embodiment of the present invention, with reference to FIG. 1 to FIG. 4.

Figure 1:
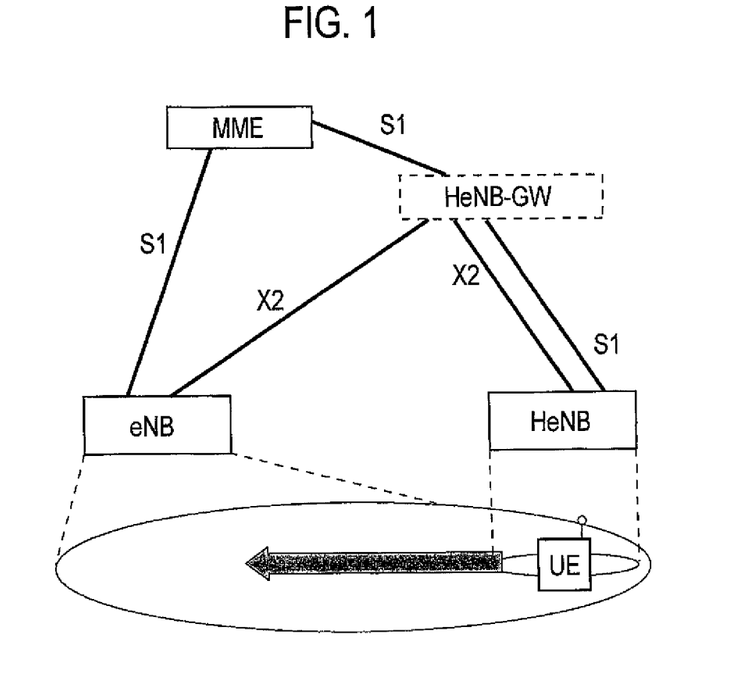
FIG. 1 is an overall configuration diagram of a mobile communication system according to a first embodiment of the present invention.
Figure 2:
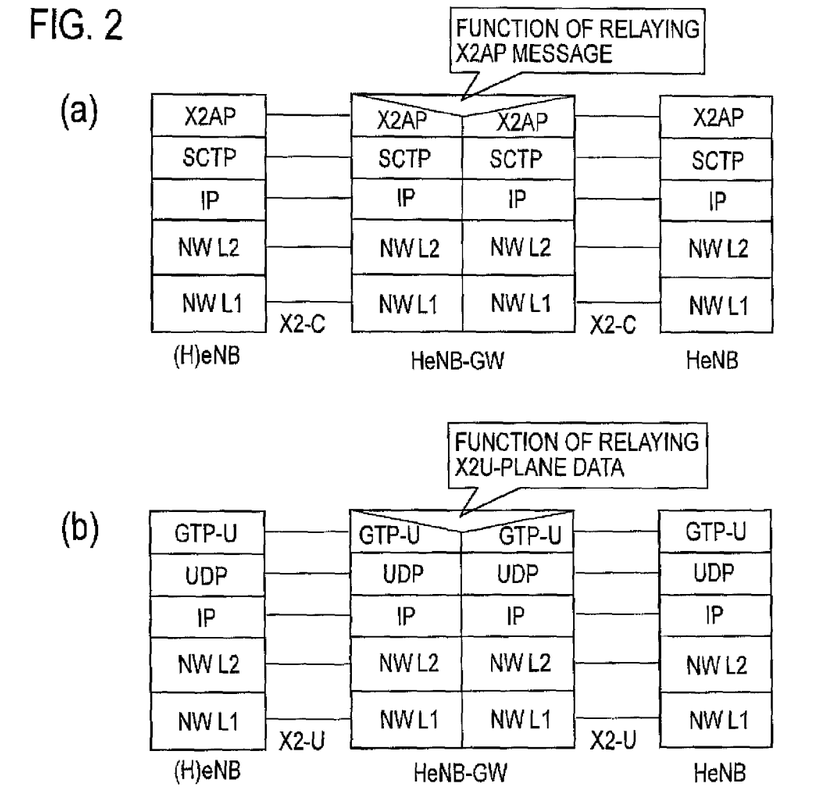
FIG. 2 is a protocol stack diagram of the mobile communication system according to the first embodiment of the present invention.

The mobile communication system according to this embodiment is a mobile communication system of an E-UTRAN scheme and is provided with a mobile switching center MME, a gateway device HeNB-GW, a radio base station eNB, and a radio base station HeNB, as illustrated in FIG. 1.

In the mobile communication system according to this embodiment, S1 interfaces are defined between the mobile switching center MME and the radio base station eNB, between the mobile switching center MME and the gateway device HeNB-GW, and between the gateway device HeNB-GW and the radio base station HeNB.

In the mobile communication system according to this embodiment, X2 interfaces are also defined between the gateway device HeNB-GW and the radio base station eNB, and between the gateway device HeNB-GW and the radio base station HeNB.

Specifically, as illustrated in FIG. 2A, an X2 C-plane (X2-C) is defined, and, as illustrated in FIG. 2B, an X2 U-plane (X2-U) is defined, between the gateway device HeNB-GW and the radio base station eNB, and between the gateway device HeNB-GW and the radio base station HeNB.

FIG. 2A and FIG. 2B provide illustrations of protocol stacks defined between the gateway device HeNB-GW and the radio base station eNB, and between the gateway device HeNB-GW and the radio base station HeNB.

Figure 3:
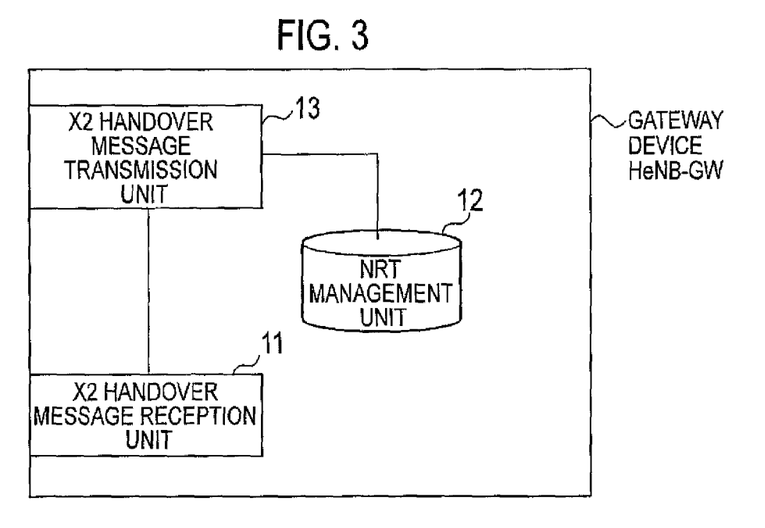
FIG. 3 is a functional block diagram of the gateway device according to the first embodiment of the present invention.

As illustrated in FIG. 3, the gateway device HeNB-GW is provided with an X2 handover message reception unit 11, an NRT (Neighbor Relation Table) management unit 12, and an X2 handover message transmission unit 13.

The X2 handover message reception unit 11 is configured to receive X2 handover messages, e.g., "(X2) HO Request" from the radio base station HeNB from which the handover is to originate.

Figure 4:
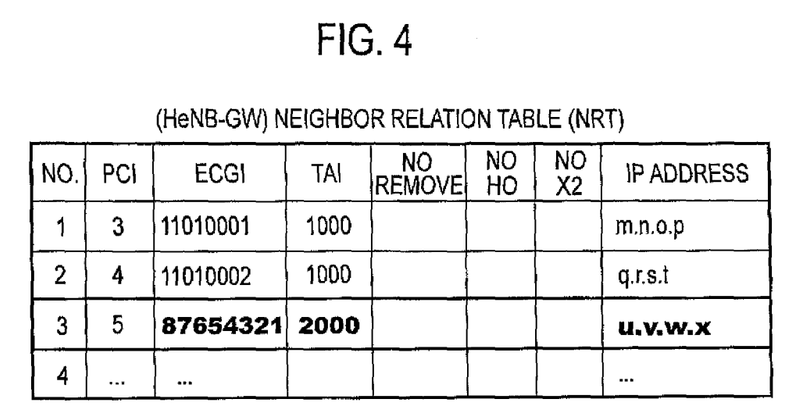
FIG. 4 is a diagram illustrating an example of NRT managed by the gateway device according to the first embodiment of the present invention.

The NRT management unit 12 is configured to manage the NRT. For example, as illustrated in FIG. 4, the NRT management unit 12 is configured to manage the NRT for associating the "PCI (Physical Cell ID)", the "ECGI (E-UTRAN Cell Global ID)", the "TAI (Tracking Area ID)", the "IP address", and the like for adjacent cells.

Herein, the NRT management unit 12 is configured to also manage, in the NRT, the information for the cell subordinate to the radio base station HeNB accommodated in the gateway device HeNB-GW.

When a handover message "(X2) HO Request" including the identification information "ECGI" on the cell subordinate to the radio base station eNB is received from the radio base station HeNB, the X2 handover message transmission unit 13 is configured to refer to the NRT managed by the NRT management unit 12 and to transfer the relevant handover message "(X2) HO Request" to the IP address corresponding to the identification information "ECGI" on the cell subordinate to the relevant radio base station eNB.

(Operation of the Mobile Communication System According to the First Embodiment of the Present Invention)

Figure 5:
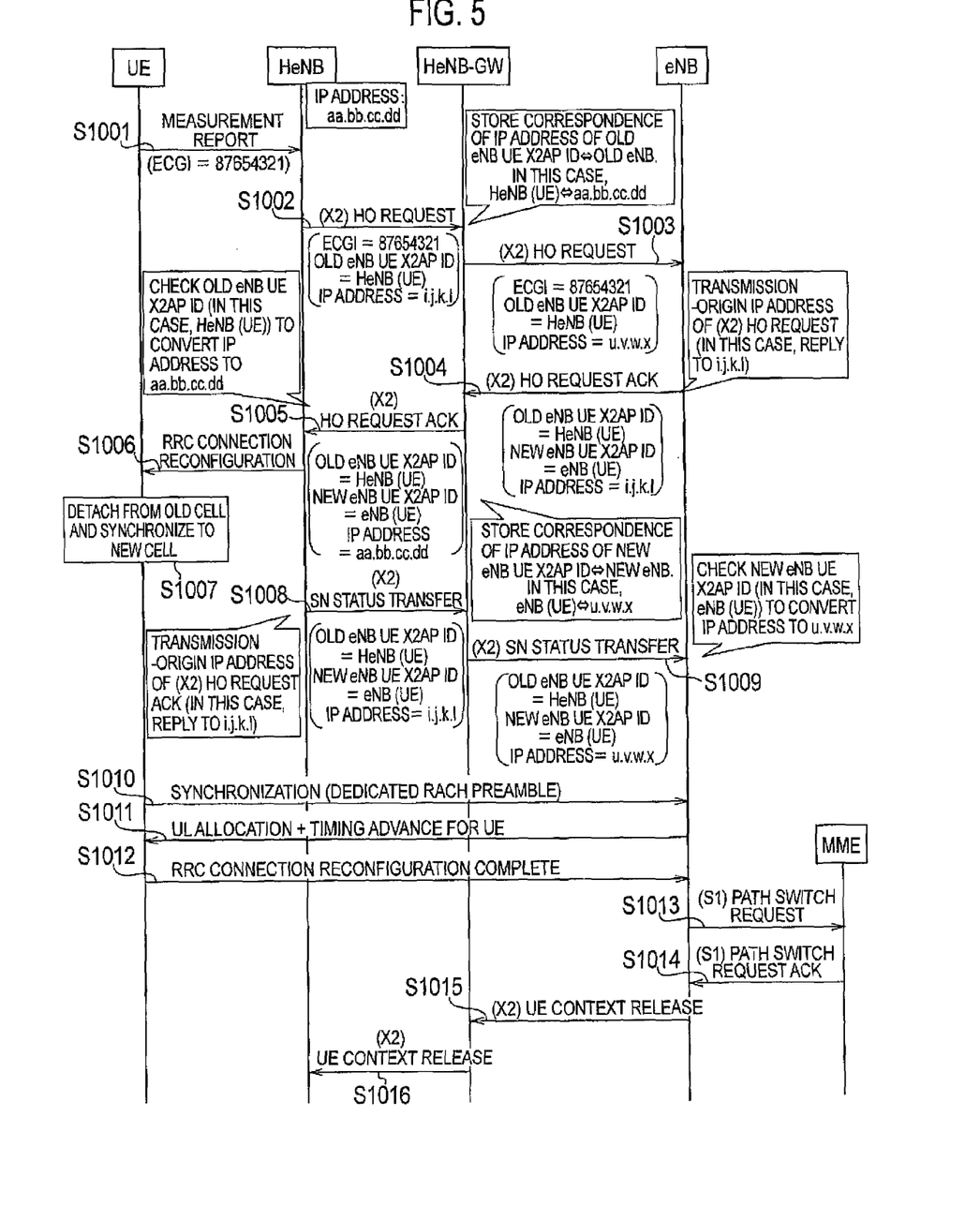
FIG. 5 is a sequence diagram illustrating the operations of the mobile communication system according to the first embodiment of the present invention.

A description will now be provided with reference to FIG. 5 for the operation in the mobile communication system according to the first embodiment of the present invention in which the mobile station UE executes a handover from the cell subordinate to the radio base station HeNB accommodated in the gateway device HeNB-GW to the cell subordinate to the radio base station eNB.

As illustrated in FIG. 5, in step S1001, the mobile station UE sends "Measurement Report" including "ECGI=87654321" to the radio base station eNB. Herein, "ECGI=87654321" is the "ECGI" of the cell subordinate to the radio base station eNB.

In step S1002, when the radio base station HeNB decides that the mobile station UE is executing an X2 handover from the cell subordinate to the radio base station eNB to the cell subordinate to the radio base station HeNB, the radio base station HeNB necessarily sends the "(X2) HO Request" including the "ECGI=87654321" and "Old eNB UE X2AP ID=eNB (UE)" to the IP address "i.j.k.l" of the gateway device HeNB-GW.

Herein, "Old eNB UE X2AP ID=eNB (UE)" is the radio base station from which the handover is to originate (which in this embodiment is the radio base station eNB), and is an ID for identifying the mobile station UE on the X2 interface.

In step S1003, the gateway device HeNB-GW refers to the NRT illustrated in FIG. 4, extracts the IP address "u.v.w.x" of the radio base station eNB corresponding to "ECGI=87654321", and transfers the "(X2) HO Rquest" including the "ECGI=87654321" and the "Old eNB UE X2AP ID=eNB (UE)" to the relevant IP address "u.v.w.x".

Herein, the gateway device HeNB-GW associatingly stores the "Old eNB UE X2AP ID=eNB (UE)" and the IP address "aa.bb.cc.dd" of the radio base station eNB.

In step S1004, the radio base station HeNB sends "(X2) HO Request ACK" including the "Old eNB UE X2AP ID=eNB (UE)" and the "New eNB UE X2AP ID=HeNB (UE)" to the transmission-origin IP address "i.j.k.l" of the "(X2) HO Request" received in step S1003.

In step S1005, gateway device HeNB-GW sends "(X2) HO Request ACK" including the "Old eNB UE X2AP ID=eNB (UE)" and the "New eNB UE X2AP ID=HeNB (UE) to the IP address "aa.bb.cc.dd" of the radio base station eNB corresponding to the "Old eNB UE X2AP ID=eNB (UE)" included in the "(X2) HO Request ACK" received in step S1004.

Herein, the gateway device HeNB-GW associatingly stores the "New eNB UE X2AP ID=HeNB (UE)" and the IP address "u.v.w.x" of the radio base station HeNB.

In step S1006, the radio base station eNB sends "RRC Connection Reconfiguration" to the mobile station UE.

In step S1007, the mobile station UE detaches from the cell from which the handover is to originate (the cell subordinate to the radio base station eNB) and synchronizes with the cell to which the handover is directed (the cell subordinate to the radio base station HeNB).

In step S1008, the radio base station eNB sends "(X2) SN Status Transfer" including the "Old eNB UE X2AP ID=eNB (UE)" and the "New eNB UE X2AP ID=HeNB (UE)" to the transmission-origin IP address "i.j.k.l" of the "(X2) HO Request ACK" received in step S1005.

In step S1009, the gateway device HeNB-GW sends the "(X2) SN Status Transfer" including the "Old eNB UE X2AP ID=eNB (UE)" and the "New eNB UE X2AP ID=HeNB (UE)" to the IP address "u.v.w.x" corresponding to the "New eNB UE X2AP ID=HeNB (UE)" included in the "(X2) SN Status Transfer" received in step S1008.

In step S1010, the mobile station UE sends, to the radio base station HeNB, "Random Access CHannel Preamble (RACE Preamble)" that has been allocated specifically to the mobile station UE; in step S1011, the radio base station HeNB sends "UL allocation+Timing Advance for UE" to the mobile station UE; in step S1012, "RRC Connection Reconfiguration Complete" is sent to the radio base station HeNB.

In step S1013, the radio base station HeNB sends "(S1) Path Switch Request" to the mobile switching center MME, and the mobile switching center MME sends "(S1) Path Switch Request ACK" to the radio base station HeNB.

In step S1015, the radio base station HeNB sends "(X2) UE Context Release" to the gateway device HeNB-GW, and in step S1016, the gateway device HeNB-GW sends the "(X2) UE Context Release" to the radio base station eNB.

(Operation and Effect of the Mobile Communication System According to the First Embodiment of the Present Invention)

According to the mobile communication system according to the first embodiment of the present invention, it is possible to reduce the process load on the mobile switching center MME, because the X2 interfaces are used to execute the process for the handover of the mobile station UE with the radio base station HeNB.

Further, according to the mobile communication system according to the first embodiment of the present invention, because it is not necessary that the radio base station HeNB manages the NRT, the process load on the radio base station HeNB can be reduced.

(First Modification)

Figure 6:
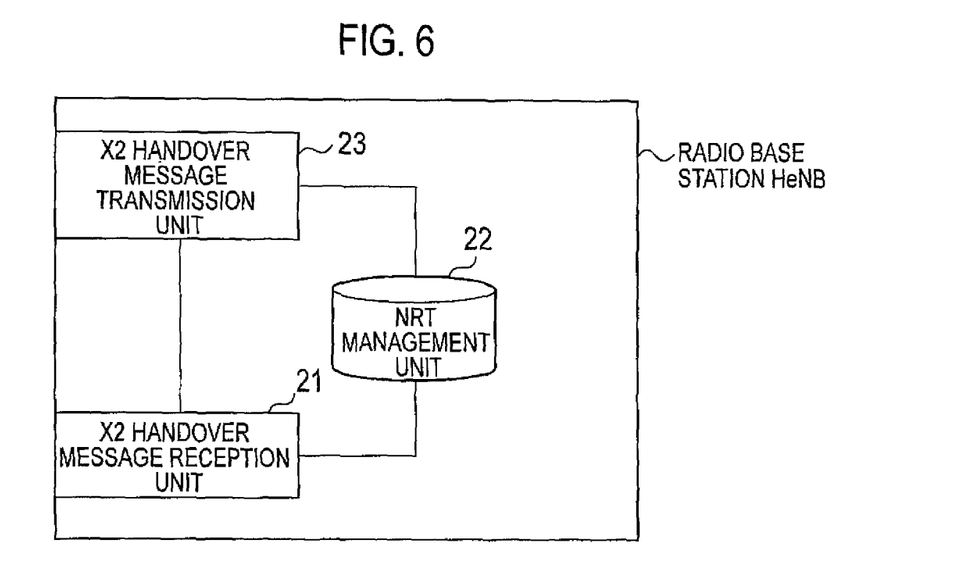
FIG. 6 is a functional block diagram of a radio base station according to a first modification of the present invention.
Figure 7:
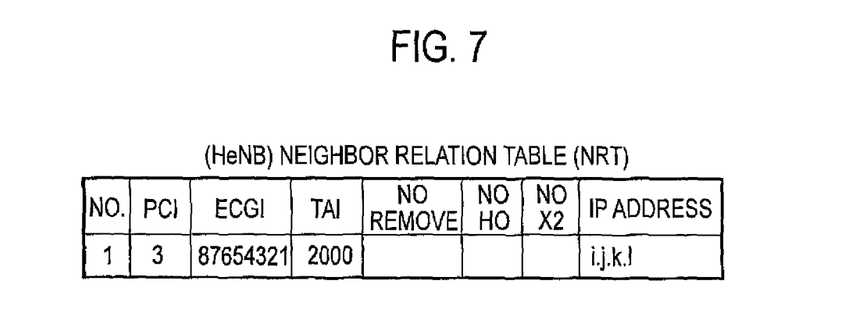
FIG. 7 is a diagram illustrating an example of NRT managed by the radio base station according to the first modification of the present invention.
Figure 8:
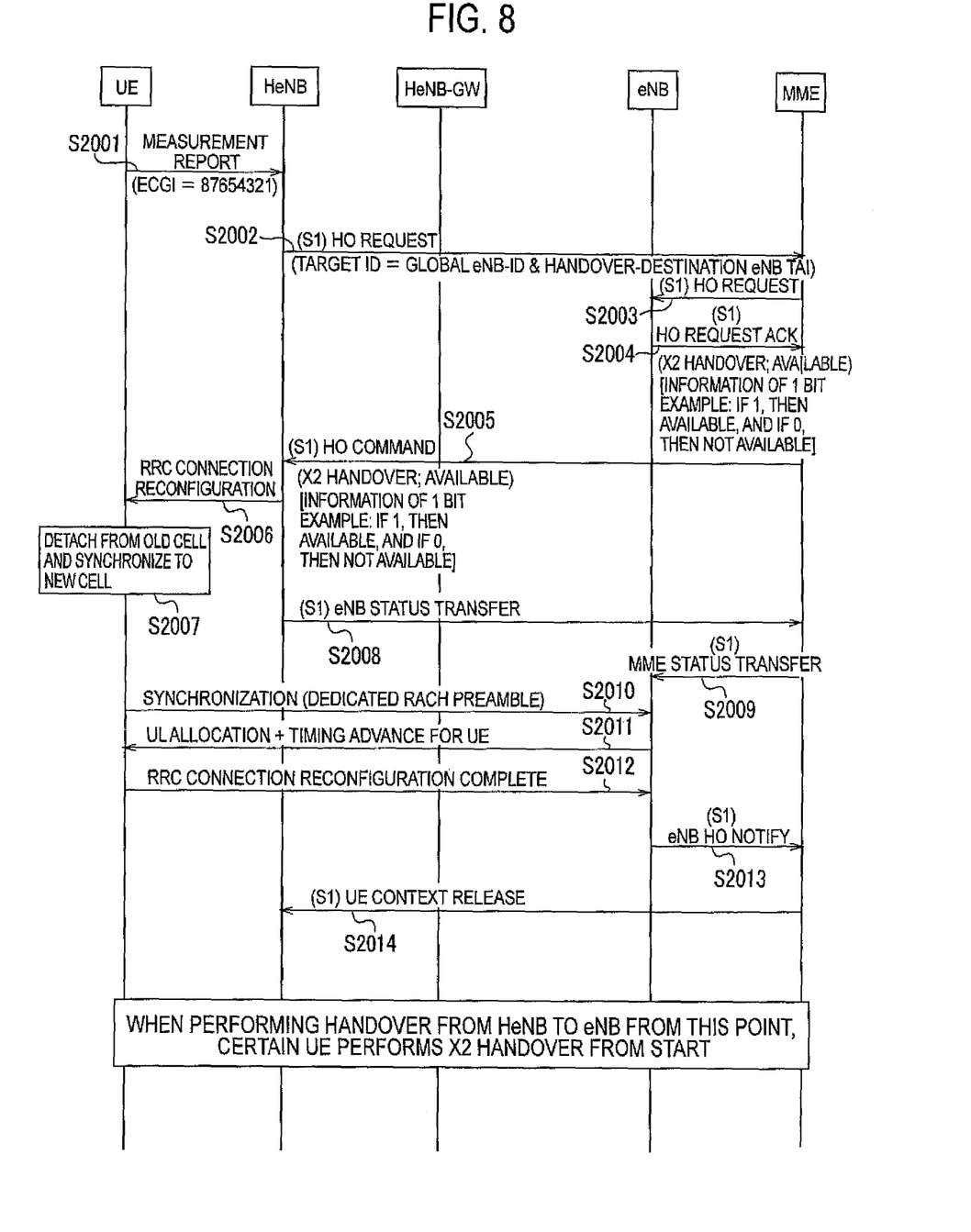
FIG. 8 is a sequence diagram illustrating the operations of the mobile communication system according to the first modification of the present invention.

A description will now be provided with reference to FIG. 6 to FIG. 8 for a mobile communication system according to a first modification of the present invention. The following is a description of the mobile communication system according to the first modification, focusing on differences from the mobile communication system according to the first embodiment described above.

As illustrated in FIG. 6, in the mobile communication system according to the first modification, the radio base station HeNB is provided with an X2 handover message reception unit 21, an NRT management unit 22, and an X2 handover message transmission unit 23.

The X2 handover message reception unit 21 is configured to receive an X2 handover message, e.g., "Measurement Report" from the mobile station UE.

The NRT management unit 22 is configured to manage the NRT. For example, as illustrated in FIG. 7, the NRT management unit 22 is configured to manage the NRT for associating the "PCI", the "ECGI", the "TAI", the "IP address", the "No X2", and the like of the adjacent cells.

Herein, "No X2" indicates whether or not an X2 interface is defined between the radio base station HeNB and the gateway device HeNB-GW, and between the radio base station eNB and the gateway device HeNB-GW; for example, in a case in which "o" is set for the "No X2", then this indicates that the relevant X2 interface is not defined, and in a case in which nothing has been set for the "No X2", then this indicates that the relevant X2 interface has been defined.

When a predetermined message "(X2) HO Preparation Failure" for indicating that an X2 handover cannot be executed has been received from the gateway device HeNB-GW, then the NRT management unit 22 is configured to set "0" for the "No X2" for the relevant cell.

When a handover instruction message "(S1) HO Command" endowed with information indicating that a handover (X2 handover) via the gateway device HeNB-GW is possible has been received from the mobile switching center MME, then the NRT management unit 22 is configured to delete the "0" that has been set for the "No X2" for the relevant cell.

When the measurement report "Measurement Report" including the identification information "ECGI" on the cell subordinate to the radio base station eNB has been received from the mobile station UE, the X2 handover message transmission unit 13 is configured to refer to the "No X2" of the NRT managed by the NRT management unit 22 and to decide whether a handover request message "(X2) HO Request" including the identification information "ECGI" on the cell subordinate to the radio base station eNB should be transmitted to the gateway device HeNB-GW, or alternatively, a handover request message "(S1) HO Required" including the identification information "ECGI" on the cell subordinate to the radio base station eNB should be sent to the mobile switching center MME.

That is, the X2 handover message transmission unit 13 is configured to decide that a handover request message "(S1) HO Required" including the identification information "ECGI" on the cell subordinate to the radio base station eNB should be sent to the mobile switching center MME in a case in which "0" has been set for the "No X2" for the cell subordinate to the radio base station eNB.

By contrast, the X2 handover message transmission unit 13 is configured to decide that the handover request message "(X2) HO Request" including the identification information "ECGI" on the cell subordinate to the radio base station eNB should be sent to the gateway device HeNB-GW in a case in which nothing has been set for the "No X2" for the cell subordinate to the radio base station eNB.

As illustrated in FIG. 4, the NRT managed by the NRT management unit 12 of the gateway device HeNB-GW also contains a similar "No X2".

Figure 9:
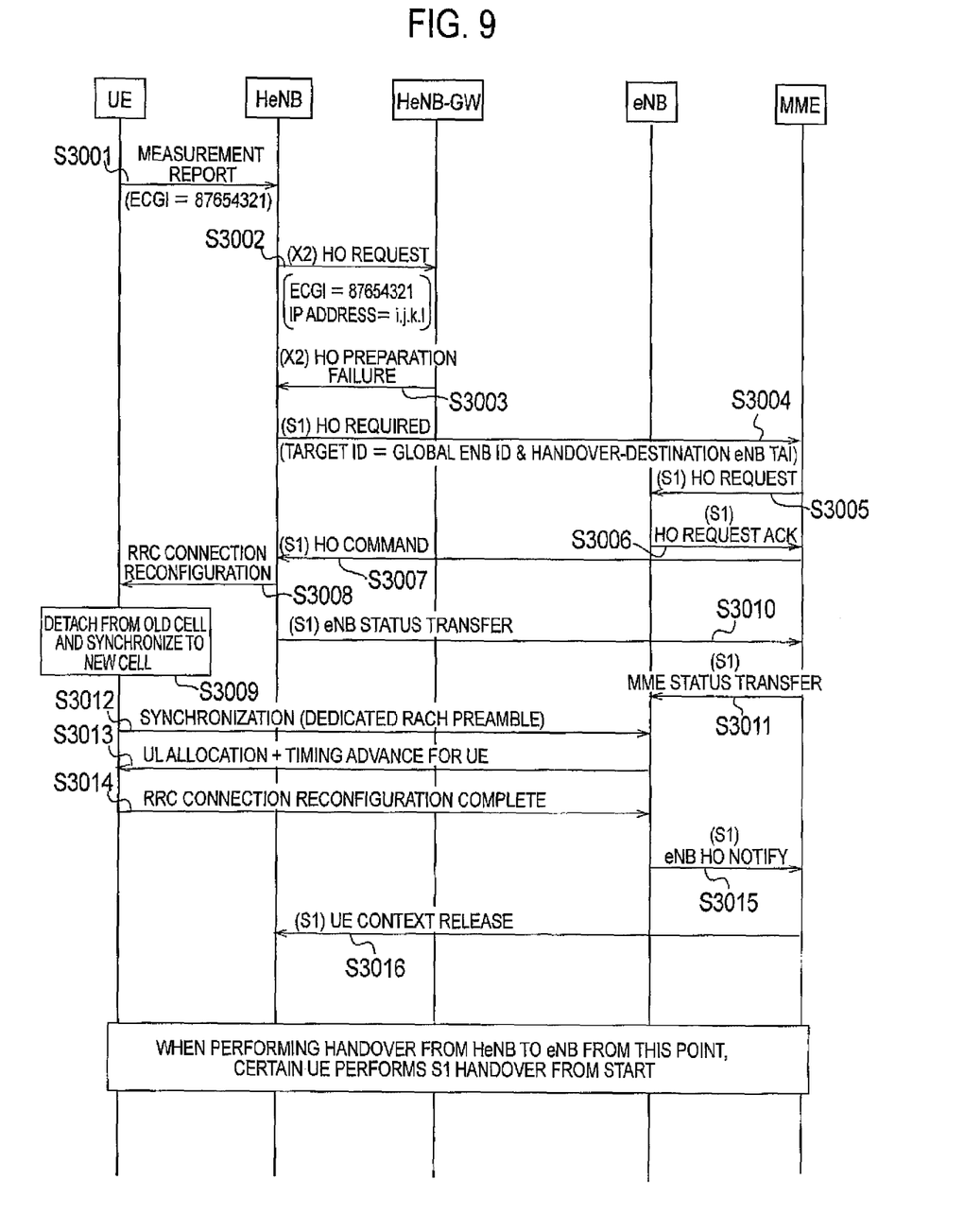
FIG. 9 is a sequence diagram illustrating the operations of the mobile communication system according to the first modification of the present invention.

A description will now be provided with reference to FIG. 8 and FIG. 9 for the operation in the mobile communication system according to the first modification of the present invention in which the mobile station UE executes a handover from the cell subordinate to the radio base station eNB to the cell subordinate to the radio base station HeNB accommodated in the gateway device HeNB-GW.

Firstly, as illustrated in FIG. 8, in step S2001, the mobile station UE sends "Measurement Report" including "ECGI=87654321" to the radio base station HeNB. Herein, "ECGI=87654321" is the "ECGI" of the radio base station eNB.

In step S2002, the radio base station HeNB conducts a search for whether the "ECGI" of the radio base station eNB reported from the mobile station UE has been registered in the NRT illustrated in FIG. 7.

Herein, when the "ECGI" of the radio base station eNB is registered in the NRT illustrated in FIG. 7 and "0" has been set for the "No X2", which is information indicating that an X2 handover is not possible, then the radio base station HeNB decides that the mobile station UE is executing an S1 handover from the cell subordinate to the radio base station HeNB to the cell subordinate to the radio base station eNB, and sends "(S1) HO Required" including the "ECGI" of the cell subordinate to the radio base station eNB to the mobile switching center MME.

In step S2003, the mobile switching center MME sends "(S1) HO Request" to the radio base station eNB.

In step S2004, the radio base station eNB determines that an X2 handover is possible, and sends, to the mobile switching center MME, "(S1) HO Request ACK" including information indicating that "X2 handover: available", which indicates the relevant determination results.

For example, such information may be configured to be constituted of one bit, where a case in which "1" has been set indicates that "X2 handover: available", and a case in which "0" has been set indicates that "X2 handover: not available".

In step S2005, the mobile switching center MME sends, to the radio base station HeNB, a handover instruction message "(S1) HO Command" including information indicating that "X2 handover: available", which indicates the relevant determination results.

Herein, the radio base station HeNB deletes the "0" that has been set in the "No X2" for the cell subordinate to the radio base station eNB.

In step S2006, the radio base station HeNB sends "RRC Connection Reconfiguration" to the mobile station UE.

In step S2007, the mobile station UE detaches from the cell from which the handover is to originate (the cell subordinate to the radio base station HeNB) and synchronizes with the cell to which the handover is directed (the cell subordinate to the radio base station eNB).

In step S2008, the radio base station HeNB sends "(S1) eNB Status Transfer" to the mobile switching center MME, and in step S2009, the mobile switching center MME sends "(S1) MME Status Transfer" to the radio base station eNB.

In step S2010, the mobile station UE sends, to the radio base station eNB, "Random Access CHannel Preamble (RACH Preamble)" that has been allocated specifically to the mobile station UE; in step S2011, the radio base station eNB sends "UL allocation+Timing Advance for UE" to the mobile station UE; in step S2012, the mobile station UE sends "RRC Connection Reconfiguration Complete" to the radio base station eNB.

In step S2013, the radio base station eNB sends "(S1) eNB HO notify" to the mobile switching center MME, and in step S2014, the mobile switching center MME sends "(S1) UE Context Release" to the radio base station HeNB.

Thereafter, the mobile station UE, when executing a handover from the cell subordinate to the radio base station HeNB to the cell subordinate to the radio base station eNB, starts by executing an X2 handover.

The determination of whether or not the above X2 handover is possible may be done by the mobile switching center MME or the gateway device HeNB-GW instead of the radio base station eNB.

Secondly, as illustrated in FIG. 9, in step S3001, the mobile station UE sends "Measurement Report" including "ECGI=87654321" to the radio base station HeNB. Herein, "ECGI=87654321" is the "ECGI" of the radio base station eNB.

In step S3002, upon deciding that the mobile station UE is executing an X2 handover from the cell subordinate to the radio base station HeNB to the cell subordinate to the radio base station eNB, the radio base station HeNB refers to the NRT illustrated in FIG. 7 and, because nothing has been set for the "No X2" for the cell subordinate to the radio base station eNB, sends "(X2) HO Request" including the identification information "ECGI" on the cell subordinate to the radio base station eNB to the IP address "i.j.k.l" of the gateway device HeNB-GW.

In step S3003, when it is determined that no entry relating to the cell subordinate to the radio base station eNB exists in the NRT or alternatively that "0" has been set for the "No X2" for the cell subordinate to the radio base station eNB (that is, that an X2 interface has not been established), then the gateway device HeNB-GW sends, to the radio base station HeNB, "(X2) HO Preparation Failure" indicating that it is not possible to transfer the "(X2) HO Request" to the radio base station eNB, i.e., that an X2 handover is impossible.

In step S3004, the radio base station HeNB sends, to the mobile switching center MME, "(S1) HO Required" including the identification information "ECGI" on the cell subordinate to the radio base station eNB, and also sets "0" for the "No X2" for the cell subordinate to the radio base station eNB.

Hereinafter, the operations of steps S3005 to S3016 are the same as the operations of steps S2003 to S2014 illustrated in FIG. 8.

Thereafter, the mobile station UE, when executing a handover from the cell subordinate to the radio base station HeNB to the cell subordinate to the radio base station eNB, starts by executing an S1 handover.

According to the mobile communication system according to the first modification, it is possible to have the mobile station UE execute a handover from the radio base station HeNB to the radio base station eNB by either an X2 handover or an S1 handover in accordance with whether or not an X2 interface has been established.

(Second Modification)

Figure 10:
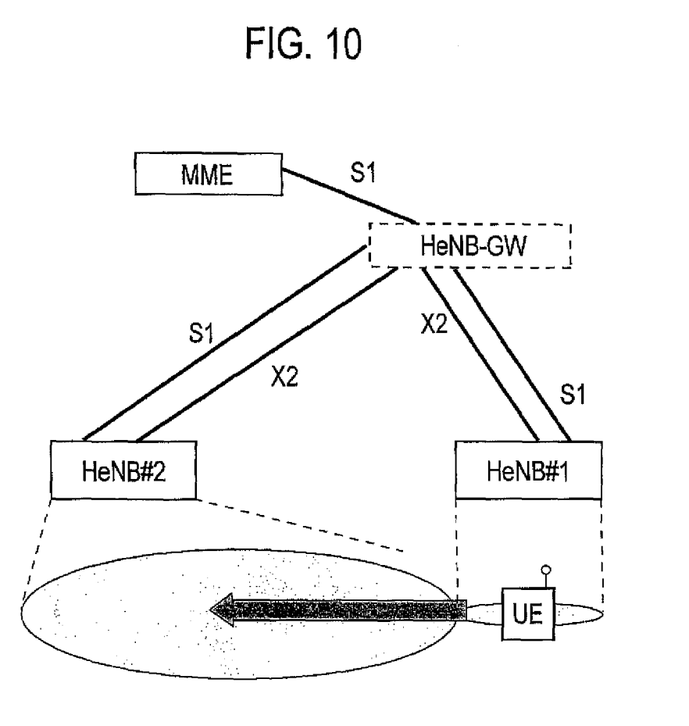
FIG. 10 is an overall configuration diagram of a mobile communication system according to a second modification of the present invention.

A description will now be provided with reference to FIG. 10 for a mobile communication system according to a second modification of the present invention. The following is a description of the mobile communication system according to the second modification, focusing on differences from the mobile communication system according to the first embodiment described above and the mobile communication system according to the first modification described above.

As illustrated in FIG. 10, the mobile communication system according to the second modification is configured such that the mobile station UE executes a handover from the cell subordinate to a radio base station HeNB#1 (the first radio base station) to the cell subordinate to a radio base station HeNB#2 (the second radio base station), which are accommodated in the same gateway device HeNB-GW.

The present invention can be adapted to such a configuration as well, in a manner similar to that of the mobile communication system according to the first embodiment and the mobile communication system according to the first modification.

The characteristics of the embodiment described above may be expressed as follows.

A first characteristic of this embodiment is summarized in that a mobile communication method in which the mobile station UE executes a handover from the cell subordinate to the radio base station HeNB (the first radio base station) accommodated in the gateway device HeNB-GW to the cell subordinate to the radio base station eNB (the second radio base station) has a step in which the mobile station UE sends the measurement report "Measurement Report" including identification information "ECGI" on the cell subordinate to the radio base station eNB to the radio base station HeNB; a step in which the radio base station HeNB sends a handover request message "(X2) HO Request" including the identification information "ECGI" on the cell subordinate to the radio base station eNB to the IP address of the gateway device HeNB-GW; and a step in which the gateway device HeNB-GW transfers the handover request message "(X2) HO Request" to the IP address corresponding to the identification information "ECGI" on the cell subordinate to the radio base station eNB.

A second characteristic of this embodiment is summarized in that a mobile communication method in which the mobile station UE executes a handover from the cell subordinate to the radio base station HeNB (the first radio base station) accommodated in the gateway device HeNB-GW to the cell subordinate to the radio base station eNB (the second radio base station) has a step in which the mobile station UE sends the measurement report "Measurement Report" including identification information "ECGI" on the cell subordinate to the radio base station eNB to the radio base station HeNB; and a step in which the radio base station HeNB decides whether a handover request message "(X2) HO Request/(S1) HO Required" including the identification information "ECGI" on the cell subordinate to the radio base station eNB should be sent to the gateway device HeNB-GW or to the mobile switching center MME.

The second characteristic of this embodiment has a step in which the radio base station HeNB sends, to the gateway device HeNB-GW, a handover request message "(X2) HO Request" including the identification information "ECGI" on the cell subordinate to the radio base station eNB, and has a step in which a predetermined message "(X2) HO Preparation Failure" is sent to the radio base station HeNB in a case in which the gateway device HeNB-GW determines that it is not possible to transfer the handover request message "(X2) HO Request" to the radio base station eNB; after having received the predetermined message "(X2) HO Preparation Failure" from the gateway device HeNB-GW, the radio base station HeNB may send a handover request message "(S1) HO Required" to the mobile switching center MME.

The second characteristic of this embodiment has a step in which the radio base station HeNB sends, to the mobile switching center MME, a handover request message "(S1) HO Required" including the identification information "ECGI" on the cell subordinate to the radio base station eNB, and has a step in which the mobile switching center MME sends, to the radio base station HeNB, a handover instruction message "(S1) HO Command" indicating that a handover (X2 handover) via the gateway device HeNB-GW is possible; after having received the handover instruction message "(S1) HO Command" from the mobile switching center MME, the radio base station HeNB may send, to the gateway device HeNB-GW, a handover request message "(X2) HO Request" that is directed to the radio base station eNB.

A third characteristic of this embodiment is a radio base station HeNB in a mobile communication system in which the mobile station UE is capable of executing a handover from the cell subordinate to the radio base station HeNB accommodated in the gateway device HeNB-GW to the cell subordinate to the radio base station eNB, characterized in being provided with a transmission unit configured to always send a handover request message "(X2) HO Request" including the identification information "ECGI" on the cell subordinate to the radio base station eNB to the IP address of the gateway device HeNB-GW when the measurement report "Measurement Report" including identification information "ECGI" on the cell subordinate to the radio base station eNB has been received from the mobile station UE.

A fourth characteristic of this embodiment is summarized in that a radio base station HeNB in a mobile communication system in which the mobile station UE is capable of executing a handover from the cell subordinate to the radio base station HeNB accommodated in the gateway device HeNB-GW to the cell subordinate to the radio base station eNB is provided with the X2 handover message transmission unit 13 configured to decide whether the handover request message "(X2) HO Request/(S1) HO Required" including the identification information "ECGI" on the cell subordinate to the radio base station eNB should be sent to the gateway device HeNB-GW or to the mobile switching center MME in a case in which the measurement report "Measurement Report" including the identification information "ECGI" on the cell subordinate to the radio base station eNB has been received from the mobile station UE.

In the fourth characteristic of this embodiment, the X2 handover message transmission unit 13 may be configured to decide to send a handover request message "(X2) HO Request" including the identification information "ECGI" on the cell subordinate to the radio base station eNB to the gateway device HeNB-GW on the basis of the decision above, and to decide that a handover request message "(S1) HO Required" is to be sent to the mobile switching center MME after having received a predetermined message "(X2) HO Preparation Failure" from the gateway device HeNB-GW, which has determined that it is not possible to transfer the relevant handover request message "(X2) HO Request" to the radio base station eNB.

In the fourth characteristic of this embodiment, the X2 handover message transmission unit 13 may be configured to decide to send a handover request message "(S1) HO Required" including the identification information "ECGI" on the cell subordinate to the radio base station eNB to the mobile switching center MME on the basis of the decision above, and to decide that a handover request message "(X2) HO Request" is to be sent to the gateway device HeNB-GW after having received a handover instruction message "(S1) HO Command" indicating that an X2 handover via the gateway device HeNB-GW is possible from the mobile switching center MME.

It is noted that the operation of the above-described the radio base station eNB/HeNB, the mobile station UE, the gateway device HeNB-GW or the mobile switching center MME may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB/HeNB, the mobile station UE, the gateway device HeNB-GW or the mobile switching center MME. Further, such a storage medium or a processor may be arranged, as a discrete component, in the radio base station eNB/HeNB, the mobile station UE, the gateway device HeNB-GW or the mobile switching center MME.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile communication method in which a mobile station executes a handover from a cell subordinate to a first radio base station accommodated in a gateway device to a cell subordinate to a second radio base station, the mobile communication method comprising:
    a step in which the mobile station sends a measurement report including identification information on the cell subordinate to the second radio base station to the first radio base station;
    a step in which the first radio base station sends a handover request message including the identification information on the cell subordinate to the second radio base station to an IP address of the gateway device;
    a step in which the gateway device transfers the handover request message to the IP address corresponding to the identification information on the cell subordinate to the second radio base station;
    a step in which the first radio base station sends a handover request message including the identification information on the cell subordinate to the second radio base station to the gateway device; and
    a step in which the gateway device sends a predetermined message indicating that a handover via the gateway device cannot be executed to the first radio base station in a case in which the gateway device determines that the handover request message cannot be transferred to the second radio base station, wherein
    the first radio base station, after having received the predetermined message from the gateway device, sends the handover request message to the mobile switching center.

2. The mobile communication method according to claim 1, comprising:
    a step in which the first radio base station sends a handover request message including the identification information on the cell subordinate to the second radio base station to the mobile switching center; and
    a step in which the mobile switching center sends, to the first radio base station, a handover instruction message indicating that a handover via the gateway device is possible, wherein
    the first radio base station, after having received the handover instruction message from the mobile switching center, sends, to the gateway device, the handover request message that is directed to the second radio base station.

3. A radio base station in a mobile communication system in which a mobile station is capable of executing a handover from a cell subordinate to a first radio base station accommodated in a gateway device to a cell subordinate to a second radio base station, the radio base station being able to behave as the first radio base station, comprising:
    a decision unit configured to decide whether the handover request message including the identification information on the cell subordinate to the second radio base station should be sent to the gateway device or the mobile switching center in a case in which the measurement report including the identification information on the cell subordinate to the second radio base station has been received from the mobile station; and
    a transmission unit configured to send the handover request message including the identification information on the cell subordinate to the second radio base station to the gateway device on the basis of the decision by the decision unit, wherein
    after a predetermined message indicating that a handover via the gateway device cannot be executed has been received from the gateway device having determined that the handover request message cannot be transferred to the second radio base station, the decision unit is configured to decide that the handover request message is to be sent to the mobile switching center.

4. The radio base station according to claim 3, provided with a transmission unit configured to send the handover request message including the identification information on the cell subordinate to the second radio base station to the mobile switching center on the basis of the decision by the decision unit, wherein
    after the handover instruction message indicating that a handover via the gateway device is possible has been received from the mobile switching center, the decision unit is configured to decide that the handover request message is to be sent to the gateway device.

* * * * *